Inventors
Leonard F. G. Butler
Ernest Briggs
Edward Bowness
By Wilkinson & Mawhinney
Attorneys.

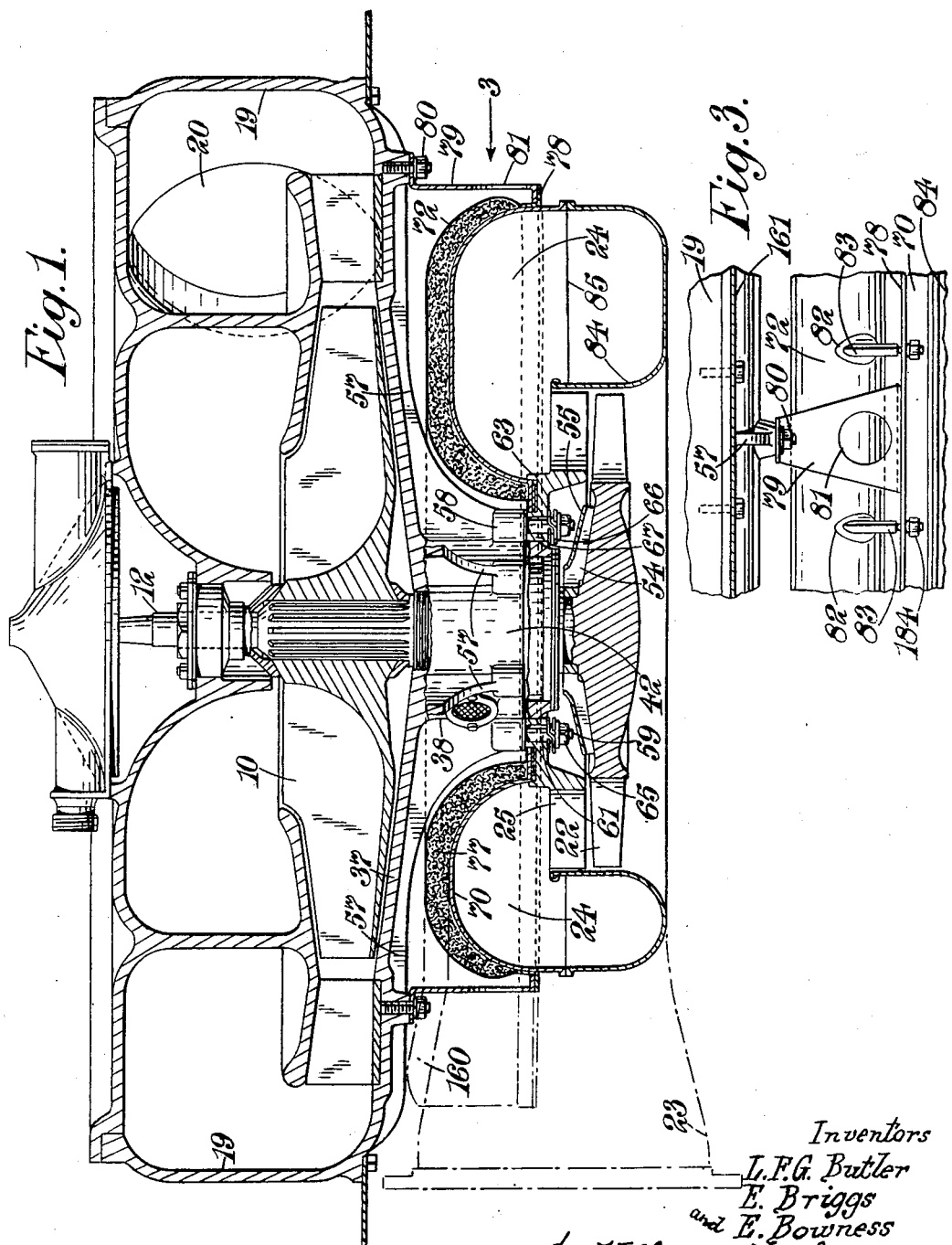

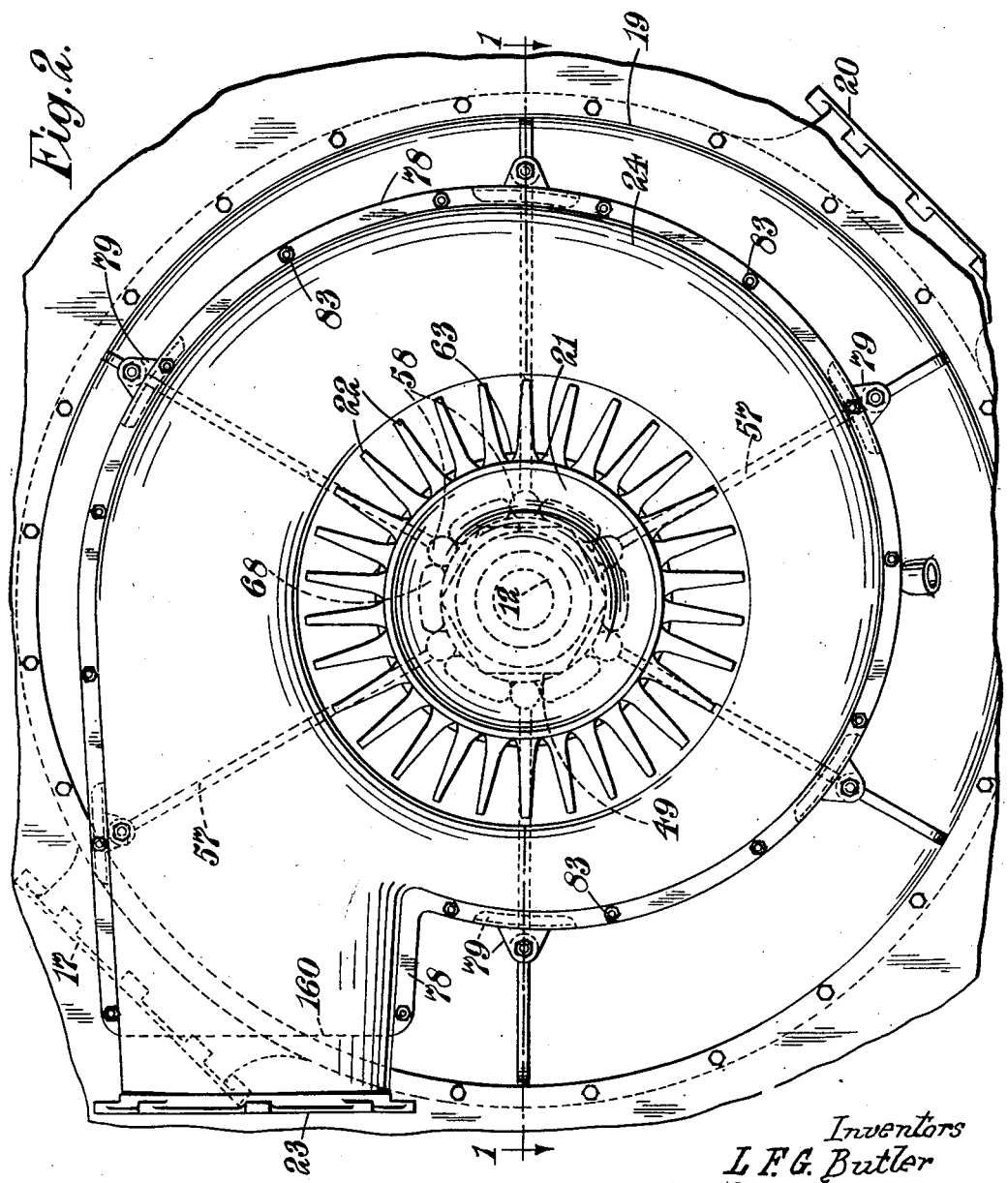

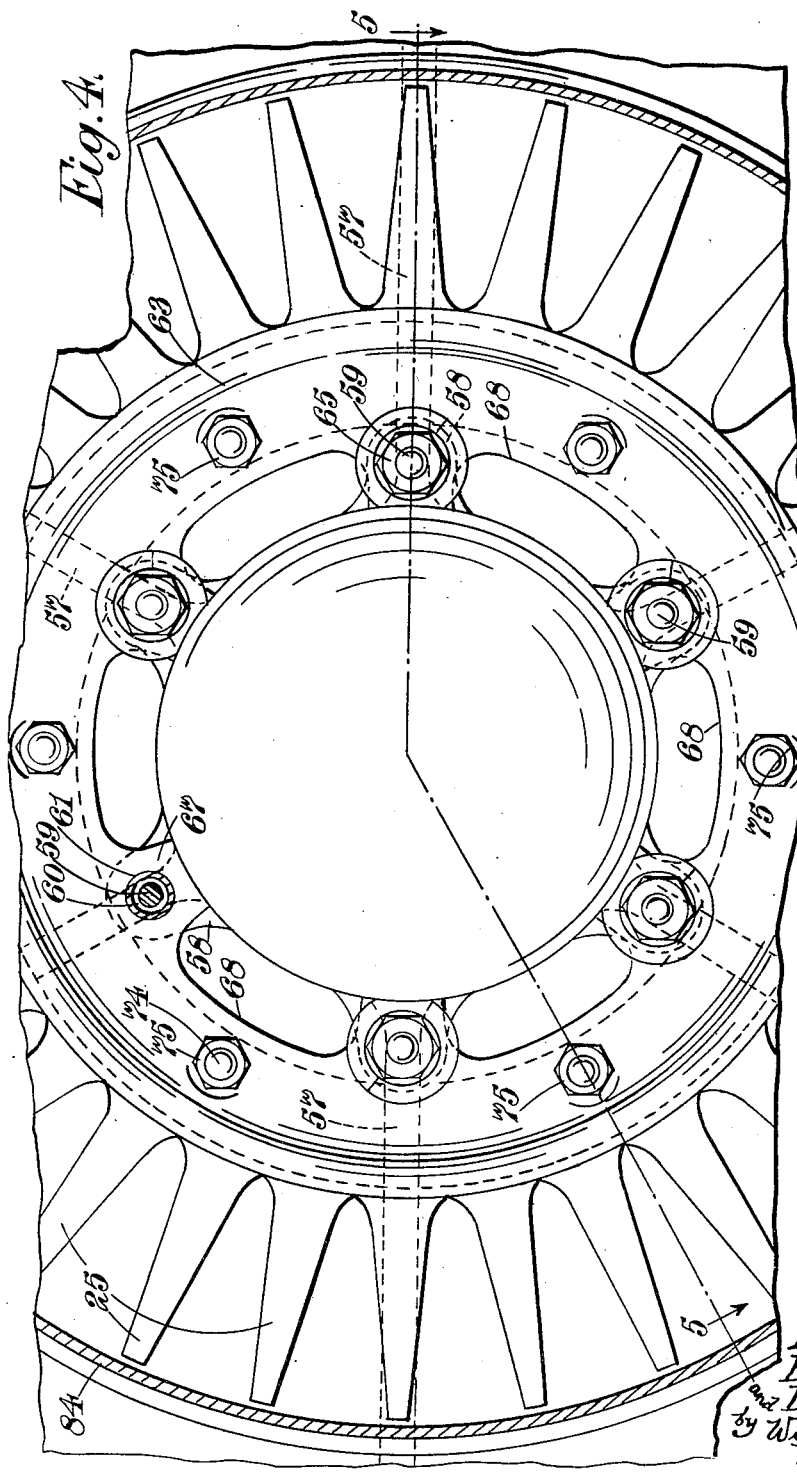

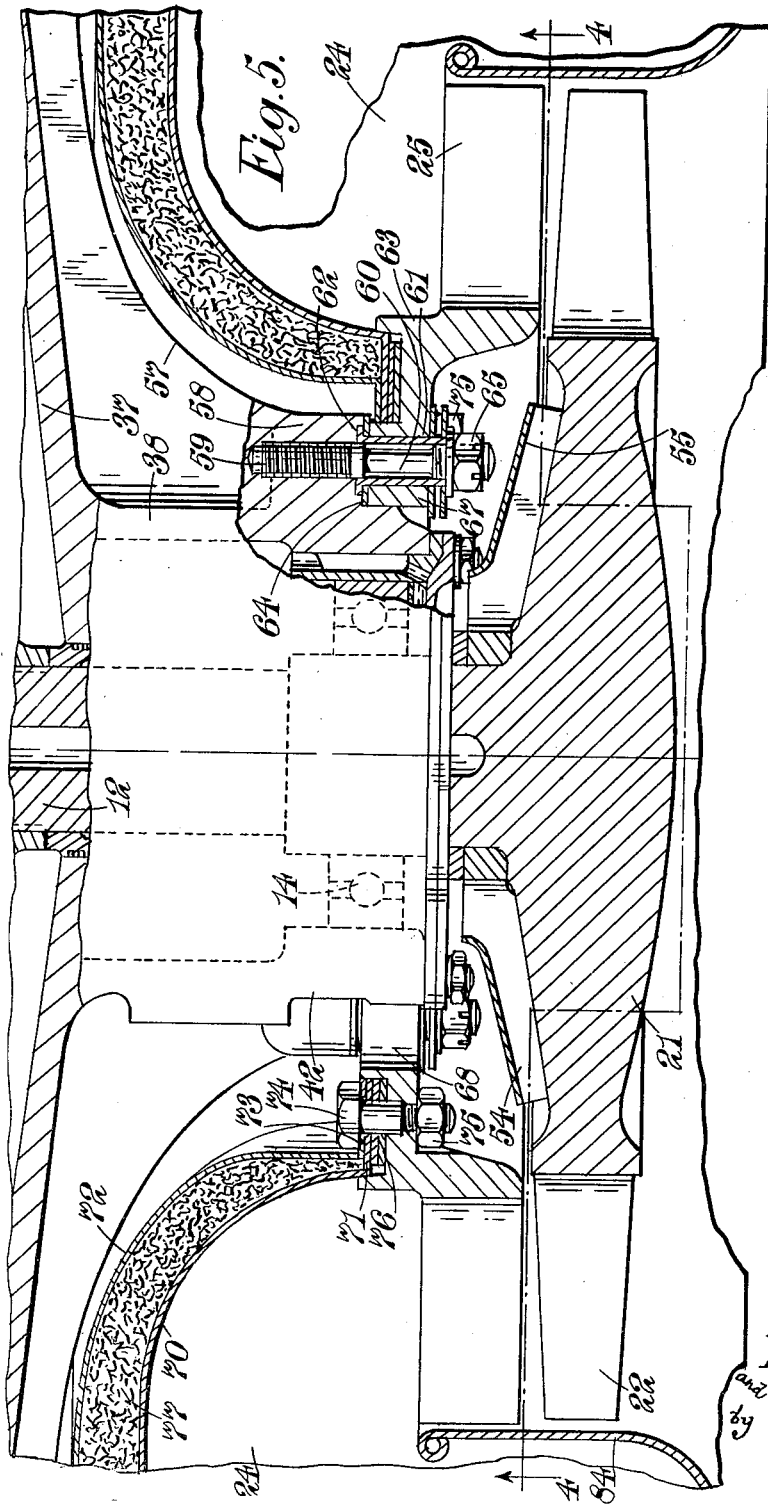

Patented Sept. 22, 1942

2,296,702

UNITED STATES PATENT OFFICE 2,296,702

GAS TURBINE

Leonard Frederick George Butler, Ernest Briggs, and Edward Bowness, Bristol, England, assignors to The Bristol Aeroplane Company Limited, Bristol, England, a British company Original application February 20, 1940, Serial No. 319,950. Divided and this application September 23, 1941, Serial No. 412,036. In Great Britain January 21, 1939

5 Claims. (Cl. 230—116)

This application corresponds to the application of The Bristol Aeroplane Company Limited, Leonard Frederick George Butler, Ernest Briggs and Edward Bowness, Serial No. 11,452/40, which was filed in Great Britain on July 9, 1940, and dated January 21, 1939 (United States Serial No. 412,036, filed September 23, 1941).

This application is a divisional of our copending United States application Serial No. 319,950, filed February 20, 1940, for improvements in "Gas turbines."

This invention relates to gas turbines such as may be used for driving the supercharging compressor of an internal-combustion engine, the turbine being driven by the exhaust gases of the engine.

The object of the invention is to provide an improved construction for preventing undue heating of the bearing or bearings of the turbine.

The gases for driving the turbine are supplied to an annular nozzle, having a ring of fixed guide-vanes, by an annular or scroll-shaped chamber and where this chamber is adjacent a bearing of the rotor there is a tendency for the heat of the gases to flow to the bearing.

According to this invention a gas turbine of the axial-flow type comprises a casing carrying a bearing for the turbine shaft, and a ring carrying the guide-vanes through which the gases flow prior to impinging on the rotor blades, wherein the ring is connected to and supported by the casing by narrow radial arms separated by wide scallops or perforations whereby said ring can conduct heat to the said bearing only along the said arms, in combination with a fan on the turbine rotor for causing a flow of air or other cooling fluid through said scallops or perforations.

According to another feature of this invention, this fan may be constructed and arranged as described in the specification of British Patent No. 525,331.

According to yet another feature of this invention, the gas chamber which constitutes the inlet passage for the hot gases to the turbine is supported on the ring aforesaid which carries the fixed guide-vanes, so that although the wall thereof may attain a high temperature, the conduction of heat from it to the bearing of the turbine is limited in the same way as is conduction of heat from the guide-vanes.

According to yet another feature of this invention, the outer periphery of the walls of the gas chamber aforesaid is supported by spaced brackets of such shape and thinness as to permit expansion and contraction of the chamber with respect to its support.

A specific embodiment of the invention will now be described in which it is applied to a gas turbine operated by the exhaust gases of an internal-combustion engine and driving the supercharger for that engine; in the accompanying drawings—

Figure 1 is a sectional elevation of the complete turbo-compressor, being mainly a section on the line 1—1 of Figure 2;

Figure 2 is a view from the underside of Figure 1;

Figure 3 is an elevation of a detail, being a view in the direction of arrow 3 of Figure 1;

Figure 4 is a view similar to Figure 2 drawn to a larger scale, being a section on the line 4—4 of Figure 5.

Figure 5 is a sectional elevation corresponding to Figure 4, being mainly a section on the line 5—5 of Figure 4.

Like reference characters indicate like parts throughout the drawings.

Figure 6:
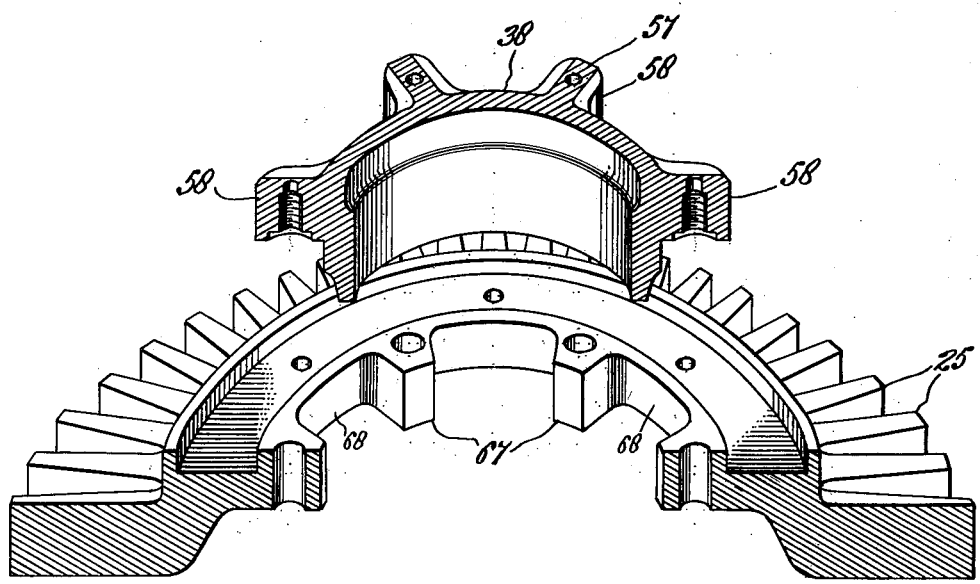
Figure 6 is a fragmentary perspective view, with parts broken away and parts shown in section, of the guide vane ring and complemental portion of the turbine casing in its assembled relation.
Figure 7:
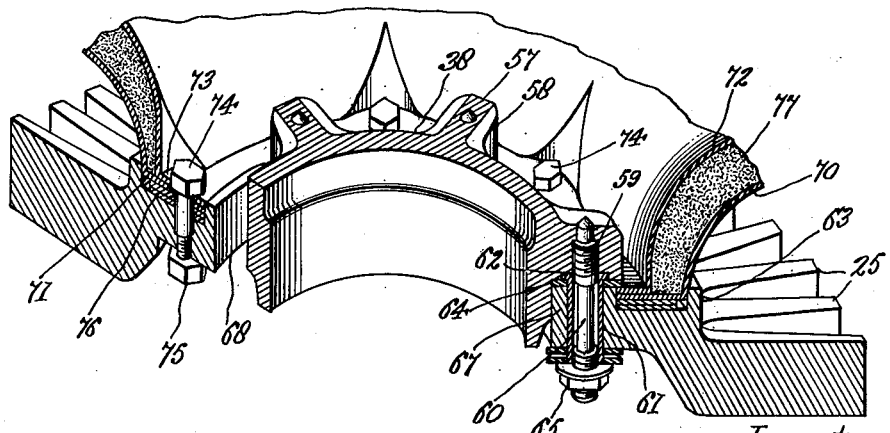
Figure 7 is a similar view with the parts assembled and fastened together and with a portion of the insulated wall of the exhaust gas chamber shown in its relation to said guide vane ring.

The general arrangement of the turbo-compressor unit is illustrated in Figures 1 and 2, with the details appertaining to this invention shown to a larger scale in Figures 3, 4 and 5. The centrifugal compressor may be of any known or usual construction comprising an impellor 10 mounted on the shaft 12 in a casing 19. The air inlet is shown at 17 and the air outlet from the usual volute chamber is shown at 20. The turbine to drive this compressor is mounted on the lower end of the shaft 12 and a bearing 14 for the shaft 12 is mounted in the extension 42 of the casing 37 of the compressor.

The lower end of the shaft 12 is formed integrally with a turbine rotor 21 having blades 22 on to which the exhaust gases of an internal-combustion engine are directed by the blades 25, such gases being supplied at 23 to a gas chamber 24 adjacent the blades 22. This gas chamber attains a high temperature and an object of the invention is to prevent heat being conducted from it to the bearing 14.

The bottom plate 37 of the compressor casing is formed with six symmetrically-disposed reinforcing ribs 57, at the innermost and lowermost point of each of which a boss 58 is formed to receive the screw-threaded end of a stud 59. The stud is formed with a reduced portion 60 in its length which passes through a sleeve 61 having a flange 62 at its upper end, the flange 62 being countersunk into the bottom face of the boss 58. The sleeve 61 engages a hole in one of a series of arms or fingers 67 extending inwardly from a ring 63 with which the guide-vanes 25 are integrally formed, the top face of each finger 67 being separated from the boss 58 by a washer 64 of asbestos or other heat-insulating material. The lower end of each stud 59 is engaged by a nut 65 which, however, is separated from the finger 67 by a spring-washer 66. It will be seen from Figure 4 that the fingers 67 are separated from one another by wide scallops or recesses 68 the purpose of which is explained below. In Figure 4 one of the studs 59 and its associated sleeve 61 are shown in section so that the shape of the finger 67 in relation to the boss 58 can be clearly seen.

The scroll-shaped chamber 24 to which the exhaust gases are admitted is supported from the ring 63 in the following manner. The top inside wall 70 of the chamber is formed with a flange 71 at its inner edge and an outer top wall 72 is similarly flanged at 73, the flanges 71 and 73 being engaged by a series of bolts 74 which pass through the ring 63 and are engaged by nuts 75. The flange 71 is, however, separated from the base of the recess in the ring 63 in which the flanges lie by two or more gaskets 76 of asbestos or other heat-insulating material. The two top walls 70 and 72 of the exhaust chamber are spaced apart and the space between them is occupied by a lagging 77 of suitable non-conducting material, which also extends at 160 along the upper side of the inlet 23.

The inside upper wall 70, at its outer edge, carries a ring 78 welded to it (see also Figure 3); welded to the ring 78 is a plurality of brackets 79 of which the upper ends are turned over and fastened to the bottom plate 37 of the compressor casing by the nuts 80 of suitable studs. Each bracket 79 is perforated as shown at 81 and is of such lightness and flexibility as will permit relative movement between the exhaust-gas chamber and the compressor casing in the manner described below. As shown in Figure 3 small plates 82 are welded to the outer wall 72 of the scroll-shaped chamber; each of these plates carries a bolt 83 passing through the flange 78 and engaging a nut 184. In this manner the two upper walls 72 and 70 of the exhaust chamber are secured together by their outer periphery.

The bottom wall 84 (see Figure 1) of the exhaust chamber is supported by being welded along the line 85 to the inner upper wall 70.

With the construction above described, the parts subjected to the highest temperature are the walls of the gas chamber 24 and the guide-vanes 25, but the conduction of heat from them to the bearing 14 is very largely reduced since all the hot parts are mounted upon or carried by the ring 63 and the only metallic contact between this ring and the casing 42 is by the ends of the fingers 67, which give a path of small cross-sectional area for heat conduction. The other possible path of conduction between the horizontal faces of the finger 67 and the bosses 58 are insulated by the asbestos washers 64. Furthermore, the wide spaces or scallops 68 between the fingers 67 constitute air passages through which air can be drawn from the space between the gas chamber walls 72 and the compressor casing 37, by means of a fan 54, 55 mounted on the turbine rotor. This fan is preferably of the construction described in the specification of British Patent No. 525,331, although any other suitable construction may be used.

A further restriction from the conduction of heat from the walls 70, 72 of the gas chamber to the ring 63 is provided by the insulating washers 76, and also by the fact that the bolts 74 are spaced between the bolts 59 in a circumferential direction, so that any heat conducted through a bolt 74 has to travel circumferentially along the ring 63 before it can reach a finger 67 which is in contact with the casing 42.

Although the invention has been described with relation to an exhaust gas driven turbo-compressor, it will be appreciated that it can be applied to any gas turbine for the purpose of restricting the flow of heat from the hot parts to the bearing.

We claim:

1. In combination, a turbine wheel, a turbine shaft therefor, bearings surrounding said shaft, a casing for the bearings, guide vanes for the turbine spaced from the casing and from said bearings, a ring carrying said vanes and also spaced from said casing, circumferentially narrow fingers with wide circumferential slots therebetween extending inwardly from said ring, and fastening means engaging said fingers and said casing.

2. In combination, a turbine wheel, a turbine shaft therefor, bearings surrounding said shaft, a casing for the bearings, guide vanes for the turbine spaced from the casing and from said bearings, a ring carrying said vanes and also spaced from said casing, circumferentially narrow fingers with wide circumferential slots therebetween extending inwardly from said ring, bosses extending outwardly from the casing and mating with said fingers, and fastening means connecting the respective bosses and fingers.

3. In combination, a turbine wheel, a turbine shaft therefor, bearings surrounding said shaft, a casing for the bearings, guide vanes for the turbine spaced from the casing and from said bearings, a ring carrying said vanes and also spaced from said casing, circumferentially narrow fingers with wide circumferential slots therebetween extending inwardly from said ring, circumferentially narrow bosses projecting outwardly from said casing and adapted to overlap said fingers, and fastening means engaging the overlapped bosses and fingers.

4. In combination, a turbine wheel, a turbine shaft therefor, bearings surrounding said shaft, a casing for the bearings, guide vanes for the turbine spaced from the casing and from said bearings, a ring carrying said vanes and also spaced from said casing, circumferentially narrow fingers with wide circumferential slots therebetween extending inwardly from said ring, means to secure said fingers to the casing, a source of cooling medium supply communicating with the slots at one side thereof, and a turbine driven fan at the other sides of said slots to circulate the cooling medium through said slots.

5. In combination, a turbine wheel, a turbine shaft therefor, bearings surrounding said shaft, a casing for the bearings, guide vanes for the turbine spaced from the casing and from said bearings, a ring carrying said vanes and also spaced from said casing, circumferentially narrow fingers with wide circumferential slots therebetween extending inwardly from said ring, means for securing said fingers to the casing, an exhaust gas chamber having a wall with a part engaging said ring, and fastening means for securing said wall part to said ring, said last named fastening means lying outwardly of intermediate portions of said slots and being offset circumferentially from the means which secure the fingers to the casing.

LEONARD FREDERICK GEORGE BUTLER.
ERNEST BRIGGS.
EDWARD BOWNESS.